Figure 1:
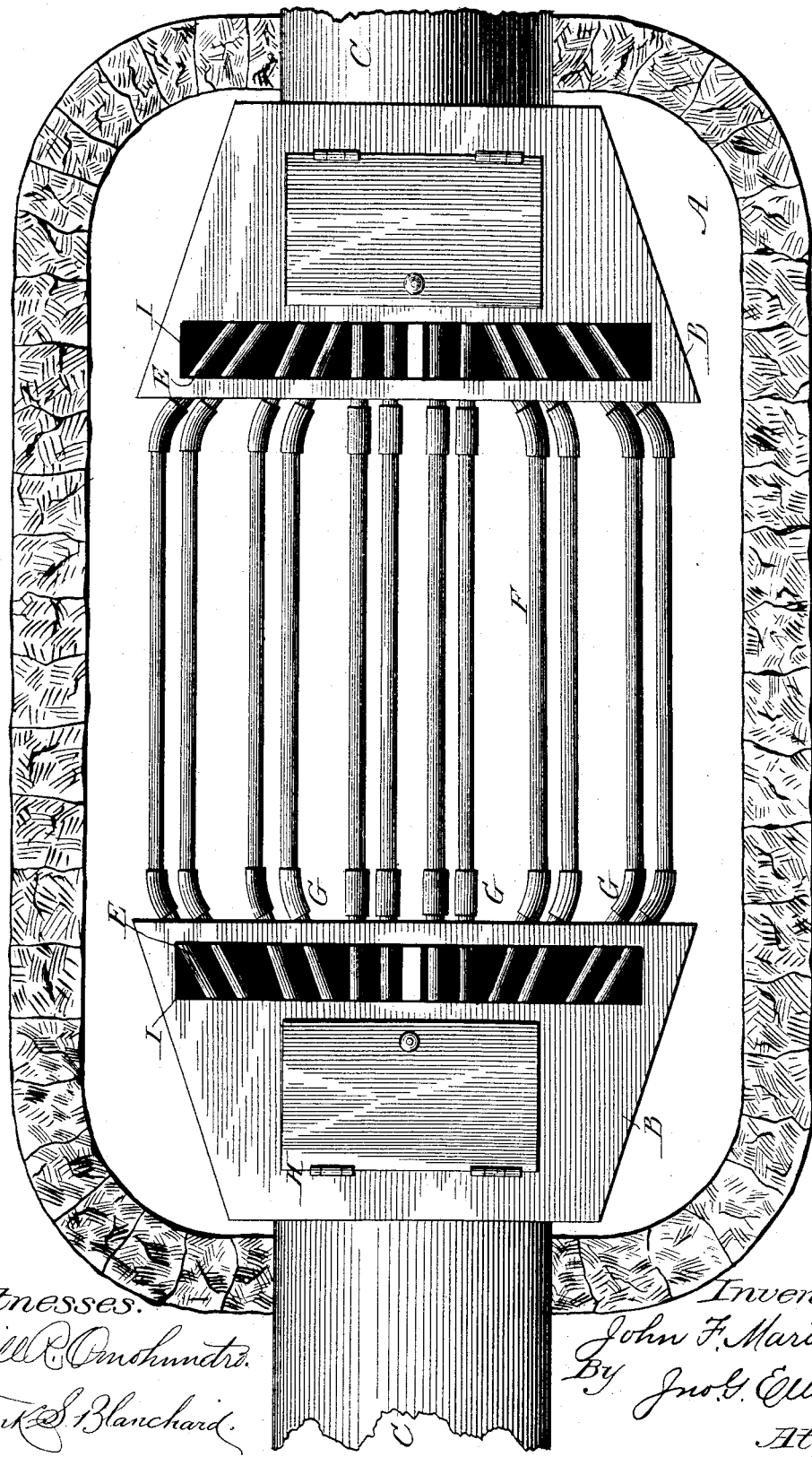

(No Model.)  3 Sheets—Sheet 1.
J. F. MARTIN.
CONDUIT FOR ELECTRIC WIRES.
No. 286,938.  Patented Oct. 16, 1883.

Witnesses.
Will R. Onstumdtz.
Frank S. Blanchard.

Inventor.
John F. Martin
By Jno. G. Elliott
Atty.

(No Model.) 3 Sheets—Sheet 2.
J. F. MARTIN.
CONDUIT FOR ELECTRIC WIRES.
No. 286,938. Patented Oct. 16, 1883.
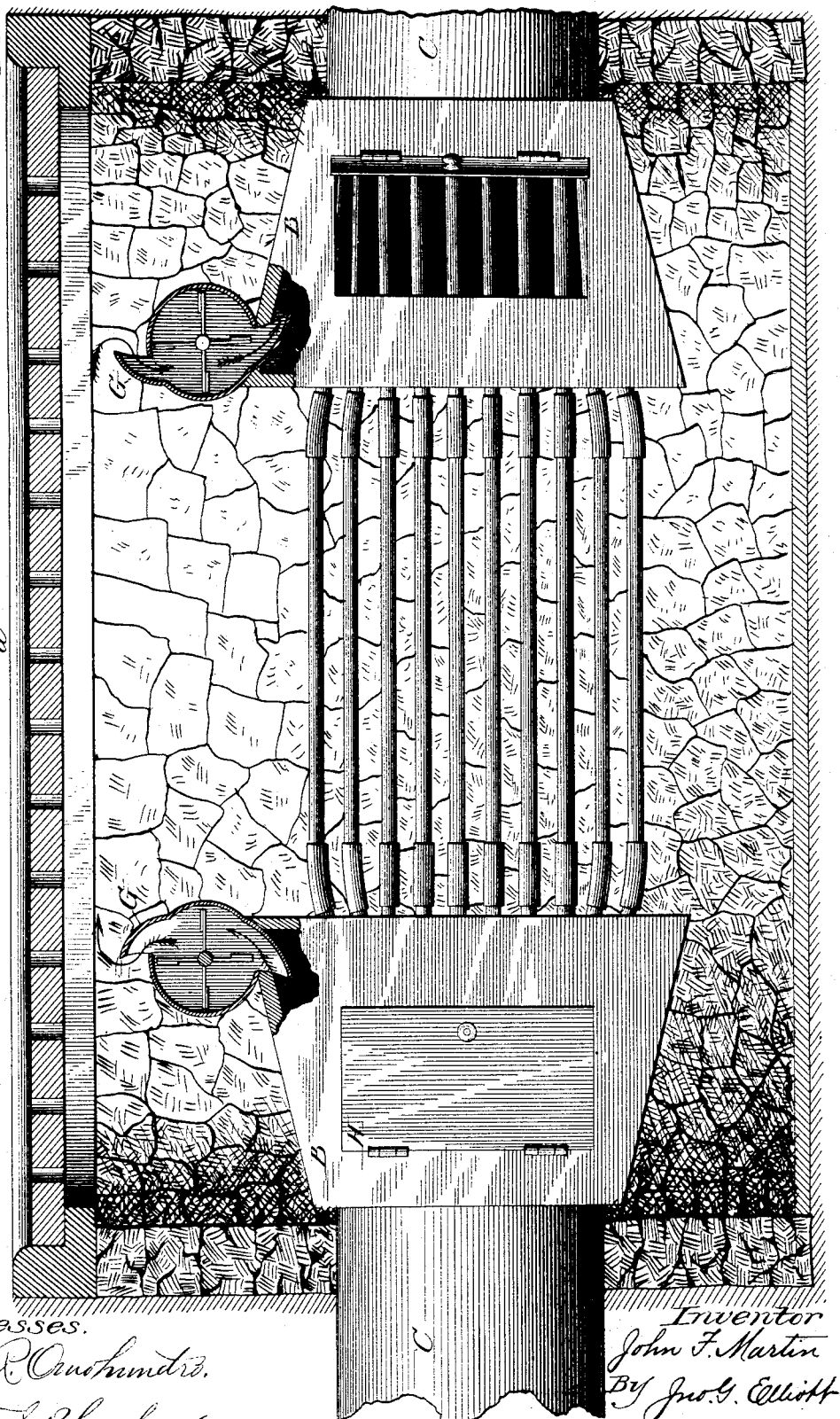
Witnesses.
Will R. Crutchendin
Frank B. Blanchard
Inventor
John F. Martin
By Jno. G. Elliott
Atty.

(No Model.)  3 Sheets—Sheet 3.
J. F. MARTIN.
CONDUIT FOR ELECTRIC WIRES.
No. 286,938.  Patented Oct. 16, 1883.
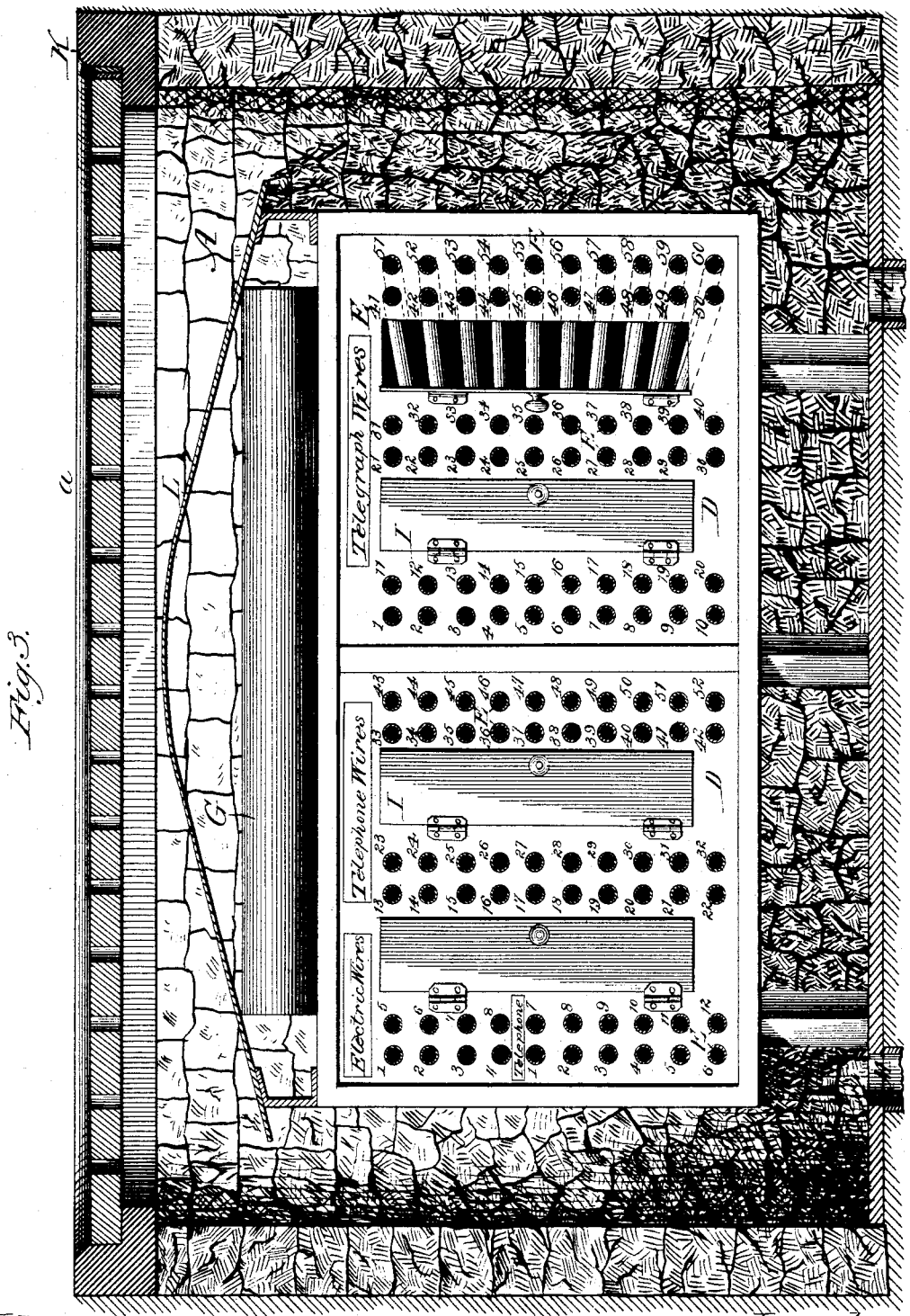
Witnesses.  Inventor
John F. Martin
By Jno. G. Elliott
Atty.

UNITED STATES PATENT OFFICE.

JOHN F. MARTIN, OF CHICAGO, ILLINOIS.

CONDUIT FOR ELECTRIC WIRES.

SPECIFICATION forming part of Letters Patent No. 286,938, dated October 16, 1883.

Application filed March 12, 1883. (No model.)

*To all whom it may concern:*

Be it known that I, JOHN F. MARTIN, a citizen of the United States, residing in Chicago, county of Cook, and State of Illinois, have invented certain new and useful Improvements in Conduits for Electric Wires, of which the following is a specification.

This invention relates to that class of systems or arrangements of electrical conducting-wires for telegraphic, telephonic, and other analogous purposes in which the line and branch wires are laid below the surface of the ground. Heretofore these wires have usually been arranged to form a multiple-wire cable, which is passed successively through the pipe-sections as the latter are laid to form a continuous conduit, and hence after the multiple-wire cable has been laid it is difficult, if not impossible, to add new wires to the cable. It is also a matter of great difficulty to take out one or more of the wires from the conduit, and in tapping the wires or in connecting the wires at joints or breaks along the route it is absolutely impossible to distinguish one wire from another, so that the operator is just as apt to tap a telephone-wire for a telegraph-wire, or to connect these two wires together in laying the lines, as he would be to tap the required wire or to connect together wires for like purposes.

The object of my invention is to remedy all such defects in underground lines of electric conducting-wires, and to provide means whereby the wires are either individually or collectively distinguishable at various points along the route. In this way the connection made by and the uses to which the wires are put can be ascertained at various points in the main, which will greatly facilitate tapping, taking out, branching off, or inspecting the wires. A further object is to provide means whereby, after the conduit has been laid, the wires can be carried through the same as they are required; also, that ready access can be had to the wires at various points along the route, and a wire or wires carried off from the main or taken out without opening the conduit or disturbing the remaining wires. The simple and convenient means which I employ for admitting of the wires being laid under ground, as they may be required, enables me to make provision for supplying wires to every house or other point in a city without taking up any of the pipe-sections of a conduit, and without crossing any of the wires or making wrong connections with the same. Another object is to provide for effectively insulating the wires at points along the route, at which points means, as hereinafter described, are provided for indicating the connections made by and the lines of the wires. These objects I attain by the system and means hereinafter described, and illustrated in the annexed drawings, in which—

Figure 1 represents a section taken horizontally through a well, and a top or plan view of the devices for indicating the wires, and for purposes hereinafter set forth, said devices being located within the well, from which latter the cap or cover has been removed. Fig. 2 represents a vertical section taken through the well and its cover, and a side elevation of the wire-indicators located therein. In this view a portion of each box is shown broken away, and two rotary fans are represented, which in Fig. 1 are not illustrated, in order that the openings in which the fans work can be clearly seen. Fig. 3 is a vertical section taken transversely through Fig. 1 on a plane just in front of one of the boxes therein shown.

Referring by letter to the several figures of the drawings, in which like letters denote like parts, let A indicate one of a series of dry wells or chambers, which I propose arranging at intervals along the route, either under the sidewalk or the street, as may be found most expedient. The continuity of the pipe-line or conduit for the electric conducting-wires is broken by each one of these wells, and at each break devices, such as hereinafter described, are arranged within the well, for the purpose of indicating the several wires and for denoting the respective positions in which certain wires are to be laid. Within each well I arrange two or more boxes or casings, B, which are respectively located at or near opposite sides of the well and connected with conduit-sections C, which enter the well through its walls. The wires which are laid within the conduit pass through these boxes and are carried across the well from box to box, as shown in Figs. 1 and 2. The front or other side portion of each box consists of or is provided with an indicator-board, D, through which are formed perforations for the passage of the wires. The number of these perforations can be equal to the greatest possible number of wires that could be called for along the line, so that provision is thereby made not only for carrying wires to such buildings along the route and those adjacent thereto as may require to be supplied at or about the time the conduit is laid, but also means afforded for carrying wires to such houses as may be subsequently erected. As means for indicating each and every wire, I number these perforations through which the wires and their insulator pass in any suitable way—as, for example, by placing figures upon the indicator-board alongside the perforations. I also classify or arrange in sets wires which are employed for different purposes. Thus over one set of wires I can arrange the words "electric wires" upon the board, whereby it will be known that the set of wires passing through the set of perforations under such heading are for electric lights. Again, it can in like manner designate another set, as telephone-wires, another, as telegraph-wires, and so on. This method of indicating the wires by names and number subserves a double purpose. First, it is of material assistance in laying the wires, and, next, it enables a person who has entered the well for the purpose of repairing, tapping, taking out, or inspecting a wire or wires to tell at a glance the wire required.

As the wells are constructed and the pipe-sections of the conduit put down before the wires are laid, it is essential that the wells should be located at such intervals along the route as will admit of the wires being readily passed through the pipes from well to well. In thus passing a wire through the conduit into one of these wells it will enter the latter through one of the indicator-boards; hence while an operator standing within the well can take hold of the wire, draw it along, and pass it through the opposite indicator-board in the well, and thence on to the next well in the route, he can also, by observing the number of the perforation in the indicator-board through which the wire entered the well, ascertain the number and class of the wire, and thereby be enabled to pass it through a correspondingly-numbered perforation in the opposite indicator-board.

It will be observed that the area of an indicator-board is greater than the sectional area of the conduit-pipe, so that in passing the wires from the pipe to the board they are spread apart, and thereby not only more readily manipulated by a person within the well, but also so separated as to be more easily distinguished. As a means for effectively insulating the wires, and also for facilitating their passage through the pipes of the conduit, I propose arranging within said pipes a set of insulating-tubes, which will preferably be arranged and supported by devices which constitute the subjects of separate applications.

These insulating-tubes E pass through the boxes or casings B, and also through the perforations in the indicator-board, one tube being provided for each separate wire, and all of the tubes being arranged to project a short distance out from the face of the board.

In drawing wires through the insulating-tubes fitted in the perforations in one indicator-board, and passing them on to the tubes fitted in the perforations of the opposite indicator-board in the same well, it is desirable to insulate and protect the exposed portions of the wires which lie between the two boards. To effect this I pass the wires through insulating-tubes F, which can be arranged between the opposing ends of the insulating-tubes which project from the indicator-boards; and in order to perfect the joints between the insulating-tubes E and F, I provide the latter with short coupling-tubes G, which can be pushed back upon the tubes while they are being held in position for the passage of the wires, and then forward over the joint, so as to cover and protect the same.

The insulating-tubes herein shown can be made of paper and glass, as described in application for Letters Patent which I have heretofore filed; or they can be made of any other suitable insulating material or materials.

In order to induce currents of air through the conduit-pipes, and also through the boxes or casings which are located within the wells, so as to keep the tubes or insulated wires dry, in order to prevent disturbances that may occur from moisture within the conduit, I provide rotary fans or blowers G, which can be arranged as shown in Figs. 2 and 3, in which it will be seen that a fan is provided for each box, one of which rotary fans tends to exhaust the air from one box, while the remaining fan tends to force air into the opposite box, as indicated by the arrows in Fig. 2. By this means air-currents can be continuously or intermittingly induced throughout the entire conduit, or any portion thereof, according to the number of fans set in motion, it being understood that two of these fans will preferably be employed in each well along the line.

The fan herein shown is made of a length nearly equal to the width of the box, and is arranged over and partially within an opening, g, which is formed transversely through the top of the box. This constitutes a simple and effective means for inducing air-currents through the conduit, although it is evident that other approved construction and arrangement of fans or blowers could be employed with good results. These two fans within the well are rotated in reverse directions by any suitable means—as, for instance, they can be driven by some approved electric motor, or they can be driven by water-power. The devices for actuating the fans can be arranged within the wells, and as their construction will readily suggest itself I have not regarded it as necessary to show the same.

To allow access to and inspection of the tubes and wires within the boxes or casings in the well, I provide each box with one or more doors, the preferred arrangement being to construct each box with side and top doors, H, and also with front doors, I, which are located in the indicator-board. Each well is properly walled with brick-work, masonry, or with some desirable casing, and also provided with a man-hole, through which an operator can descend into the well for the purpose of laying, taking out, or tapping the wires.

The cover a for the man-hole will in general be provided with perforations i, and can be made of metal. This cover is hinged to a frame, K, let down into the street or sidewalk, so as to be flush with the surface thereof, whereby no obstruction shall be presented along the street or walk, and hence no objectionable feature involved by the use of the well.

In order to protect both the fans and the insulated wires which are between the boxes from such dirt or water as may find its way into the well from above, I propose arranging a shed, L, over the boxes and the spaces between them. This roof or shed can be supported upon the boxes, and will constitute an efficient guard against dirt and water. One or more drain-pipes, M, are arranged to lead from the well to an adjacent drain or sewer, so that water shall not collect in the well, and the well be kept dry and clean. In some instances it might be desired to further protect the boxes and wires from dust or moisture, and in such case the boxes and wires running between them could be all inclosed by a box or casing provided with suitable doors, which, upon being opened, will allow access to the indicator devices and wires. When it is desired to form a branch line or lines running from one of these wells a third, and also a fourth, box provided with an indicator-board, substantially as shown, could be arranged within the well and connected with the pipe-sections of a conduit running laterally to the main line. A portion of the wires can be carried from one of the boxes B to such additional box or boxes, so as to be passed into the pipes connected therewith in the same way as the wires are carried from one to the other of the boxes herein shown, with the exception that flexible joints or insulating-tubes should be provided, so as to allow the wires to be bent without cracking the tubes by which they are insulated.

From the foregoing it will be seen that lines of conduits with wells which contain indicating devices of the character hereinbefore described can be laid and built under as many of the streets of a city as may be desired, and that the insulating-tubes for the wires can be arranged within the conduit pipes and boxes, so as to be kept in readiness for the wires; also, that the wires as they may be needed for houses along the route can be carried through the insulating-tubes, and each wire become known by the number which is next to it upon the indicator-board. In this way, for example, should it be desired to place a certain house in telephonic communication with a central office, the wire from the latter will be passed through one of the insulating-tubes located in the set of perforations arranged under the head of "telephones" on the indicator-board and carried along through the conduit, in the manner hereinbefore described. The said title will therefore designate the use of the wire, while the number will indicate the house supplied.

In case it is desired to carry a multiple-wire cable through the conduit-pipes and to omit the fixed insulating-tubes, one indicator-board could be provided in each well, so that after the cable has been drawn through one section of the conduit-pipe and brought into a well the wire could be passed through the numbered perforations in an indicator-board and then carried on to the next well, in which the wires can be again passed through a like indicator-board, and then carried on to the next well or to some suitable distributer located either below or above the surface of the ground.

Distributers for the wires will necessarily be located at suitable intervals along the route, or at some suitable common point. These distributers can be of various construction, the preferred one being that shown in a separate application for Letters Patent.

While the wires are individually designated by numbers, they could be designated by letters or names in place of the numbers; but as I have made provision for a great number of wires, numbers will be found the most convenient for the purpose.

Having thus described my invention, what I claim, and desire to secure by Letters Patent, is—

1. The combination, with the two pipe-sections of an underground conduit which opens into a well, of the boxes located within the well and connected with the pipe-sections, and the perforated indicator-boards formed with or secured to said boxes, substantially as described.

2. The combination, with a pipe-section of an underground conduit opening into a well, of a perforated indicator-board and a set of insulating-tubes arranged within the well and fitted in the perforations of the indicator-board, substantially as described.

3. The combination, with the pipe-sections of an underground conduit opening into a well, of the boxes provided with perforated indicator-boards and doors and connected to the pipe-sections, substantially as described.

4. The combination, with the rigid insulating-tubes extending from an underground conduit into a well, of flexible insulating-tubes within the well, coupled with the rigid tubes to form continuous lines of tubing that can be bent within the well in any desired direction, substantially as described.

5. The combination, with the pipe-section of an underground conduit opening into a well, of the perforated indicator-board, the insulating-tubes extending from the pipes to the indicator-board, and the flexible insulating-tubes connected with the ends of the insulating-tubes that are extended from the conduit to the indicator-board, substantially as described.

6. The combination, with the rigid insulating-tubes extending from the pipe-section of an underground conduit into a well, of means for supporting the ends of the tubes within the well, flexible tubes intermediate of the rigid tubes, couplings for connecting the rigid and flexible tubes, and wires laid within the tubular insulators, from which they can be at any time withdrawn, substantially as described.

7. The combination, with the pipe-sections of an underground conduit opening into a well, of the boxes with perforated indicator-boards, and the insulating-tubes, through which the wires pass, extending from the conduit through the boxes to the indicator-boards, said boards being provided with numerals for individually designating the wire passing through the tube, and the perforations in which the tubes are fitted being arranged in sets that are classed under appropriate letters, substantially as described.

JOHN F. MARTIN.

Witnesses:
W. W. ELLIOTT,
JNO. G. ELLIOTT.